United States Patent Office 3,714,272
Patented Jan. 30, 1973

3,714,272
NITRATION WITH NITRIC ACID AND
TRIFLUOROMETHANESULFONIC ACID
Clifford L. Coon, Fremont, and Marion E. Hill, Palo
Alto, Calif., assignors to Stanford Research Institute,
Menlo Park, Calif.
No Drawing. Filed Feb. 7, 1972, Ser. No. 224,275
Int. Cl. C07c 79/10, 79/12
U.S. Cl. 260—645
4 Claims

ABSTRACT OF THE DISCLOSURE

Two moles of trifluoromethanesulfonic acid combine with one mole of nitric acid to form a white crystalline solid having excellent nitrating capabilities when employed either in an organic solvent medium or in sulfuric acid or an excess of the trifluoromethanesulfonic acid. The nitration reaction can be conducted using one or another of these media at temperatures ranging from about −110° to 30° C., with any side reactions being substantially absent. The process is characterized by high positional selectivity, and when nitrating toluene to dinitrotoluene, total content of meta isomers can be kept at levels well below 1 percent by using an organic solvent and low temperatures. Yields exceed 98 percent.

SUMMARY OF THE INVENTION

The present invention relates to a method for nitrating aromatic compounds in which the nitrating reagent is made up of a reaction product of nitric acid with trifluoromethanesulfonic acid. The process is particularly useful for introducing one or two nitro groups into benzene or benzene derivative compounds wherein the ring is substituted by one or more loweralkyl, halo, nitro, or halo-(lower)alkyl groups, the term "loweralkyl" being here employed to designate alkyl groups containing from 1 to 4 carbon atoms, e.g., methyl, ethyl, and the various propyl and butyl groups. The nitration is conducted in an organic solvent medium or in one made up of sulfuric acid and/or an excess of the trifluoromethanesulfonic acid. Water may be and usually is present in amounts of from about 1 to 10% by weight, as added with the nitric acid or with any sulfuric acid employed.

The invention is especially well adapted to be employed in connection with the production of dinitrotoluene from toluene, and is characterized in this application by the production of an isomer mixture having an extremely low total content of meta isomers.

The reaction which takes place between $HNO_3$ and $CF_3HSO_3$, hereinafter designated by the symbol (I), to form the nitrating reagent has been discovered to be as follows:

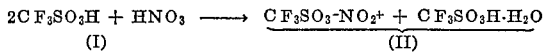

$$2\,CF_3SO_3H + HNO_3 \longrightarrow \underbrace{CF_3SO_3^-NO_2^+ + CF_3SO_3H \cdot H_2O}_{(II)}$$
(I)

The mixture of the nitronium trifluoromethanesulfonate and trifluoromethane-sulfonic acid monohydrate reaction products, which hereinafter is collectively designated by the symbol (II), takes the form of a white hygroscopic crystalline solid which melts at 60 to 65° C. and sublimes at 60 to 70° C. (at 1–2 mm. Hg).

(II) has been found to be an excellent nitrating reagent for aromatic compounds, and such compounds as toluene, benzene, nitrobenzene, chlorobenzene, m-xylene, and benzotrifluoride have been nitrated in good yield. This nitrating reagent can be dispersed in a variety of reaction media and shows very high positional selectivity as regards emplacement of the nitro groups in the ring. Reaction media employed include methylene chloride, trichlorofluoromethane, carbon tetrachloride, sulfuric acid and (I), and which (II) is insoluble in these media, quantative yields of the desired nitrated products can nevertheless be obtained in relatively short reaction times by maintaining good agitation of the reaction mixture. (II) has been used over a temperature range of −110° to 30° C., and, at least in the case of toluene, the mono- and dinitration yields are consistently greater than 98 percent.

While high positional selectivity is important in the case of numerous nitrated aromatic compounds which can be prepared with (II) in the process of this invention, this factor is of particular significance when nitrating toluene to form mono- and dinitrotoluenes. Accordingly, the invention will be particularly described hereinafter as it relates to reactions of (II) with toluene.

Dinitrotoluene is of particular utility as an intermediate in the preparation of diisocyanates employed in the manufacture of polyurethane foams and elastomers. The highest quality polyurethane products are prepared using the 2,4-dinitrotoluene isomer as the starting compound, and the quality of the polyurethane falls off as the content of the 2,6-dinitrotoluene isomer in the starting material increases. Further, in preparing products of this character every effort is made to exclude the 3,5-, 3,4-, 2,3- and 2,5-dinitrotoluenes (the so-called "meta" isomers) inasmuch as they contribute to the production of an off-colored, yellowish polyurethane product. A variety of methods are available for separating the 2,6- and the meta isomers from the 2,4-isomer, and all are relatively expensive. Further, the isomers removed in this fashion are much less valuable than the remaining 2,4-isomer. The present invention is well adapted to produce a mixture of dinitrotoluene isomers which is extremely low in total meta isomer content and has a high ratio of the 2,4- to the 2,6-dinitrotoluene isomer.

(II) is an effective nitrating reagent, for toluene at temperatures ranging from −110 to 30° C. At −110, −90 and −60° C., only mononitrotoluene is formed, whereas at temperature of about 0° C., or higher, complete dinitration occurs. Reactions run at about −30° C., for example, produce mixtures of mono- and dinitrotoluenes.

The reaction of (II) with toluene or other organic starting compounds is an efficient one and therefore requires no excess of (II). However, a slight excess thereof such as about 1 to 10 percent is preferred, and reaction systems containing a two- to fourfold excess of II can be used, if desired. Thus, in forming dinitrotoluene, one equivalent of toluene was quantitatively converted to dinitrotoluene in one hour at 0° C. in $CH_2Cl_2$, using but 2.05 equivalents of (II). Similarly, only a very slight excess of (II) is needed to quantitatively nitrate toluene to mononitrotoluene at −60° C. in an organic solvent.

The reaction time necessary for the complete mononitration of toluene, even at temperatures as low as −110° C., is approximately one minute. The dinitration step at 0 to 30° C., whether feeding toluene or dinitrotoluene, requires about an hour for completion.

(II) exhibits a high degree of positional selectivity in aromatic nitrations. In a $CFCl_3$ reaction medium, for example. (II) mononitrates toluene at −110, −90, and −60° C. to give a mixture of mononitrotoluene isomers that contains 0.23, 0.36, and 0.53% meta isomers, respectively. Since most meta substitution takes place during the mononitration stage, the final meta-isomer content in dinitrotoluene can be further controlled by running the mononitration step at very low temperature, followed by a step wherein the mononitro product is converted to dinitrotoluene at 0° C. Thus, when mononitration steps were carried out in an organic solvent at −110, −90, −60, and −30° C., followed by dinitration at 0° C., the resulting dinitrotoluene products contained 0.3, 0.5. 0.7, and 1.08%, respectively, of meta isomers. These percentages are much lower than those achieved by any other known nitration procedure.

At 0 and 20° C. in an organic solvent medium, toluene reacts with (II) to give quantitative yields of dinitrotoluene isomer mixtures that contain 1.33 and 1.72% meta isomers, respectively. These values are still relatively low by comparison with those obtained in aqueous nitration systems currently used for dinitrotoluene synthesis, where the yield of meta isomers is from about 3 to 4%.

When toluene is nitrated with (II) in $H_2SO_4$ or excess (I) as the reaction medium, meta substitution is relatively low, though somewhat higher than that found when the reaction is run in an aromatic medium. For example, nitration of toluene with (II) in excess (I) at $-5°$ C. gave a total meta isomer content of 1.46%. With no excess of (I), but using $H_2SO_4$ as the medium and with a reaction temperature of $-20°$ C., the total meta isomer content of the product is 1.58%. With both $H_2SO_4$ and an excess of (I), and using reaction temperatures of $-20°$ C. and 0° C., the total meta isomer contents are 1.17% and 1.74%, respectively. In all these cases (except that wherein excess (I) alone is used) the nitrating mixture also contained approximately 3% $H_2O$.

In addition to influencing the course of meta-isomer formation in the nitration of toluene, reaction temperatures also have an effect on the ratio of o- to p-mononitrotoluene isomers and on that of 2,4- to 2,6- dinitrotoluene isomers. For example, reactions run at $-60$, $-90$, and $-110°$ C. in $CFCl_3$ gave o/p mononitrotoluene isomer ratios of 1.66, 160, and 1.03, respectively. The 2,4/2,6-dinitrotoluene isomer ratio is very closely related to the o/p mononitrotoluene ratio. Thus, when the mononitration of toluene is carried out in organic solvents at $-110$, $-90$, $-60$, $-30$, and 0° C., followed in each case by dinitration at 0° C., the 2,4/2,6 isomer ratios are 6.88, 4.63, 5.24, 5.28, and 4.98, respectively. The nitrating system using a reaction medium composed of both (I) and sulfuric acid is more sensitive than the organic solvent system to the effect of temperature on selectivity as shown by the change in the 2,4/2,6 ratio from 5.6 to 8.7 as nitration temperature is lowered from 0 to $-20°$ C.

DESCRIPTION OF THE PREFERRED EMBODIMENTS

The following examples are illustrative of the invention but are not to be construed as limiting the same. The various percentages employed therein, as well as cated. The initials "DNT" are used to designate dinitrocated. The initial "DNT" are used to designate dinitrotoluene, with "MNT" designing mononitrotoluene.

Example 1.—Reaction of $CF_3SO_3H$ with $HNO_3$, Method A

Under an atmosphere of $N_2$ a 6.00 g. sample (40 mmol) of trifluoromethanesulfonic acid was placed in a 50-ml. flask equipped with a mechanical stirrer, $N_2$ inlet tube, and dropping funnel. To this stirred liquid was added dropwise 1.26 g. (20 mmol) of anhydrous nitric acid. As the nitric acid was added a white crystalline solid was continually formed. The resulting solid was allowed to stir 1 hr. to assure complete mixing and reaction. The product was shown to contain approximately the original weights of starting material by elemental analysis. It melted at 60–65° C. and sublimed at 60–70° C. (1–2 mm. Hg). Ir (infrared) (KCl pellet) 525 (m.), 590 (m.), 640 (s.), 765 (m., very sharp), 830 (w.), 850 (w.), 880 (w.), 1030 (w.), 1150–1180 (vs.), and 1230–1300 cm.$^{-1}$ (s.); Raman (crystalline) 321 (C–S), 351 ($SO_3$), 520 ($CF_3$), 580 ($NO_2^+$), 776 ($CF_3$), 1038 ($SO_3$), 1160, 1188 ($CO_3$), 1228 ($CF_3$), 1323, and 1409 cm.$^{-1}$ ($NO_2^+$).

*Analysis.*—Calcd. for $C_2H_3NO_9F_6S_2$ (percent): C, 6.61; H, 0.83; F, 31.39; N, 3.06; S, 17.66. Found (percent): C, 6.59; H, 1.31; F, 34.9; N, 3.48; S, 16.44.

Example 2.—Reaction of $CF_3SO_3H$ with $HNO_3$, Method B

Under an atmosphere of $N_2$, 6.00 g. (40 mmol) of trifluoromethanesulfonic acid was dissolved in 100 ml. of $CH_2Cl_2$ in a 200-ml. flask equipped with a mechanical stirrer, $N_2$ inlet tube, thermometer, and addition funnel. To this solution was added dropwise at 25° C. 1.26 g. (20 mmol) of anhydrous nitric acid; no exotherm was noted. The solution was stirred for 15 min. and then filtered under $N_2$ to collect a white crystalline solid. Not all of the solid was collected, since some adhered to the sides of the flask. The solid 6.67 g., was dried under vacuum over $P_2O_5$ and NaOH: M.P. 60–64° C. The IR (infrared) spectrum of this product was identical to that obtained from the product from Method A.

*Analysis.*—Calcd. for $C_2H_3NO_9F_6S_2$ (percent): C, 6.61; H, 0.83; N, 3.06. Found (percent): C, 6.58; H, 1.21; N, 3.29.

Example 3.—Preparation of dinitrotoluene using $CF_3SO_3H/HNO_3$ nitrating system A nitrating mixture consisting of 50.0 g. of $CF_3SO_3H$ (333 mmol) and 6.30 g. of anhydrous $HNO_3$ (100 mmol) was prepared in a 100-ml., 3-necked flask equipped with a mechanical stirrer, addition funnel, and thermometer, this representing a nitrating mixture containing 89% $CF_3SO_3H$ and 11% $HNO_3$. The mixture was cooled to 0° C. and 4.00 g., of toluene (43 mmol) was added over a 10-min. period. The reaction mixture was stirred at 0° for 1 hr. and quenched on 500 g., of crushed ice. The resulting mixture was extracted with three 100-ml. portions of $CH_2Cl_2$ which were combined and dried ($MgSO_4$). Removal of solvent left 7.75 g. (98%) of a light yellow solid that was identified as a mixture of dinitrotoluene isomers by IR spectrum. A VPC (vapor phase chromatography) analysis of this product showed that it contained 15.70% 2,6-DNT, 0.51% 2,3- and 2,5-DNT, 82.84% 2,4-DNT and 0.95% 3,4-DNT. Total meta isomer content was 1.46%.

Example 4.—Preparation of dinitrotoluene using $CF_3SO_3H/H_2SO_4/HNO_3/H_2O$ nitration system A nitrating mixture was prepared by combining 6.34 g. of 70.30% $HNO_3$ (0.071 mole) with 34.27 g. 96.96% $H_2SO_4$ and 34.18 g. $CF_3SO_3H$. This represents a nitrating mixture containing 45.5% $CF_3SO_3H$, 45.5% $H_2SO_4$, 6% $HNO_3$ and 3% $H_2O$. To a slurry of this nitrating mixture at $-20°$ C. was added 1.62 g. of toluene (0.018 mole) dropwise over a period of 2 min. After the reaction was stirred for 1 hr. at $-20$ to $-18°$ C., it was poured onto 1500 ml. of ice water. The aqueous phase was extracted with three 400 ml. portions of methylene chloride, these were combined and dried ($MgSO_4$), and the solvent was removed under vacuum leaving 2.37 g. of dinitrotoluene; yield >98%. This produce was analyzed by VPC and found to contain 10.19% 2,6-DNT, 0.31% 2,3- and 2,5-DNT, 88.64% 2,4-DNT, and 0.86% 3,4-DNT. Total meta isomer content was 1.17%.

Example 5

The process of Example 4 is repeated except that the reaction is conducted at 0° C. rather than at $-20°$ C. Here the product contained 14.85% 2,6-DNT, 0.64% 2,3- and 2,5-DNT, 83.42% 2,4-DNT and 1.10% 3,4-DNT, for a total meta isomer content of 1.74%.

Example 6

The process of Example 4 is repeated, except that the nitrating mixture contains 22.7% $CF_3SO_3H$, 68.3% $H_2SO_4$, 6% $HNO_3$ and 3% $H_2O$. Here the reaction product contains 12.06% 2,6-DNT, 0.43% 2,3- and 2,5-DNT, 86.37% 2,4-DNT and 1.15% 3,4-DNT, for a total meta isomer content of 1.58%. It will be observed that in this operation there was an excess of nitric acid over that required to form the (II) nitrating agent with $CF_3SO_3H$.

Example 7.—Preparation of mononitrotoluene using $CF_3SO_3H$ and $HNO_3$ in $CH_2Cl_2$ A nitrating mixture was prepared by the addition of 1.26 g. of 100% $HNO_3$ (0.020 mole) to 6.00 g. of $CF_3SO_3H$ (0.060 mole) in 100 ml. of methylene chloride. At this point the mixture consisted of a white solid suspended in a clear liquid. The mixture was cooled to −90° C. and 0.46 g. (0.005 mole) of toluene was added in one portion, and the reaction mixture stirred at −90° C. for 4 hr. The −90° C. mixture was poured into 100 ml. of ice water and the organic phase was separated and combined with two 25 ml. methylene chloride extractions of the aqueous phase. After treatment of the $CH_2Cl_2$ phase with $MgSO_4$, the product was isolated by removal of solvent in vacuo. Weight of mononitrotoluene was 0.73 g.; yield >98%. A VPC analysis of this product showed that it contained 61.85% o-MNT, 0.35% m-MNT, and 37.08% p-MNT.

Example 8.—Preparation of mononitrotoluene using $CF_3SO_3H$ and $HNO_3$ in $CH_2Cl_2$ A solution containing 6.00 g. (40 mmol) of trifluoromethanesulfonic acid dissolved in 100 ml. $CH_2Cl_2$ was placed in a 200-ml. flask equipped with a mechanical stirrer, addition funnel, and thermometer. A 1.26-g. sample of anhydrous $HNO_3$ (20 mmol) was added to this solution causing a white crystalline solid to separate from solution. The temperature of the mixture was lowered to −60° C. by means of a dry ice-acetone bath, and 0.46 g. of toluene (5 mmol) was added in one portion. The mixture was stirred at −60° for 1 hr. and then quickly poured onto 100 g. of crushed ice. The resulting mixture was extracted with three 100-ml. portions of $CH_2Cl_2$. These were combined and dried ($MgSO_4$), and the solvent removed under vacuum leaving 0.69 g. (100%) of mononitrotoluenes. A VPC analysis of this product showed that it contained 62.12% o-nitrotoluene, 0.53% m-NMT, and 37.35% p-MNT; a trace (<0.1%) of DNT was present.

Example 9.—Preparation of dinitrotoluene using $CF_3SO_3H$ and $HNO_3$ in $CFCl_3$ A mixture containing 6.00 g. of trifluoromethanesulfonic acid (40 mmol) and 100 ml. of $CFCl_3$ was prepared in a 200-ml. flask equipped with a mechanical stirrer, addition funnel, and thermometer. A 1.26 g. sample (20 mmol) of anhydrous $HNO_3$ was added at 25° C. causing the formation of the $2CF_3SO_3H/HNO_3$ complex. The temperature of the reaction was lowered to 0° C. and 0.46 g. of toluene(5.0 mmol) was added in one portion. The mixture was stirred for 1 hr. at 0° C. and poured onto 100 g. of crushed ice. Three 100-ml. $CH_2Cl_2$ extractions were combined and dried over $MgSO_4$. The solvent was removed leaving 0.90 g. (99%) of a light yellow solid that was identified as a mixture of dinitrotoluene isomers by its IR spectrum. A VPC analysis of this product showed that it contained 16.47% 2,6-DNT, 0.45% 2,3- and 2,5-DNT, 82.36% 2,4-DNT, and 0.72% 3,4-DNT. Total meta isomer content was 1.17%.

Example 10

The process of Example 9 is repeated, but using $CCl_4$ as the organic solvent rather than $CFCl_3$. The distribution of dinitrotoluene isomers is essentially the same in the two cases, though here the dinitrotoluene yield is 96% rather than 98.9% due to the presence of a small percentage of mononitrotoluene.

Example 11.—Preparation of dinitrotoluene using $CF_3SO_3H$, $HNO_3$ and $CH_2Cl_2$ A solution containing 6.00 g. of trifluoromethanesulfonic acid (40 mmol) in 100 ml. $CH_2Cl_2$ was prepared in a 200-ml., 3-necked flask equipped with a mechanical stirrer, addition funnel, and thermometer. The addition of 1.26 g. of anhydrous $HNO_3$ (20 mmol) caused the precipitation of the white crystalline $2CF_3SO_3H/HNO_3$ complex. The temperature of the mixture was lowered to −60° C. by means of a Dry Ice-acetone bath and 0.46 g. of toluene (5.0 mmol) added in one portion. After the mixture was stirred at −60° C. for one hour, the reaction temperature was raised to 0° C. over a 10-min. period and the mixture stirred at 0° C. for 1 hr. The reaction mixture was poured onto 100 g. of crushed ice, and the organic products extracted into $CH_2Cl_2$ (3× 100 ml.). The $CH_2Cl_2$ extracts were combined, dried ($MgSO_4$), and the solvent removed leaving 0.91 g. (100%) of a light yellow solid that was identified as a mixture of dinitrotoluenes by its IR spectrum. A VPC analysis of this product showed that it contained 17.48% 2,6-DNT, 0.28% 2,3- and 2,5-DNT, 82.07% 2,4-DNT, and 0.47% 3,4-DNT. Total meta isomer content was 0.75%.

Example 12

The operation of Example 11 is repeated, but with the mononitration step being conducted for 180 minutes at −90° C., and with the dinitration step being conducted for 120 minutes at 0° C. Here the reaction product, obtained in a yield of 98.9%, contains 17.67% 2,6-DNT, 81.82% 2,4-DNT and a total meta isomer content of 0.51%.

Example 13

The process of Example 11 is repeated, but with the mononitration step being conducted for 120 minutes at −60° C., and with $CFCl_3$ being used as the solvent. The dinitrotoluene product, obtained in a yield of 100%, contained 16.63% 2,6-DNT, 82.89% 2,4-DNT and a total meta isomer of 0.48%.

Example 14

The process of Example 11 is repeated, but with the mononitration step being conducted at −30° C. rather than −60° C. The dinitrotoluene product, obtained in a yield exceeding 99%, contained 15.75% 2,6-DNT, 83.17% 2,4-DNT and a total meta isomer content of 1.08%.

Example 15.—Nitration of chlorobenzene

Chlorobenzene was nitrated to nitrochlorobenzene according to the method of Example 9. The reaction was run at 25° C. for 2.4 hr. using 6.30 g. (42 mmol) of $CF_3SO_3H$, 1.32 g. (21 mmol) anhydrous $HNO_3$, and 2.25 g. (20 mmol) of chlorobenzene in 53 ml. of $CH_2Cl_2$. Product weight, 3.21 g. (100% yield based on $HNO_3$). VPC analysis showed 3% dinitrochlorobenzene. The o-, m- and p-nitrochlorobenzene percentages were 30.5, 0.1 and 69.4% respectively.

Example 16.—Nitration of nitrobenzene

Nitrobenzene was nitrated according to the method to the method of Example 9. The reaction was run at 25° C. for 5 hr. using 6.0 g. (40 mmol) of $CF_3SO_3H$, 1.26 g. (20 mmol) anhydrous $HNO_3$, and 0.98 g. (8.0 mmol) nitrobenzene in 60 ml. of $CH_2Cl_2$. Product weight was 1.25 g. (98%). VPC analysis showed 8.96, 88.75, and 2.29% of o-, m-, and p-dinitrobenzene, respectively.

Example 17.—Nitration of benzotrifluoride

Benzotrifluoride was nitrated according to the method of Example 9. The reaction was run at 25° C. for 16 hr.; reaction times of 1 to 5 hr. were not sufficient for complete nitration. The reaction was run using 6.00 g. (40 mmol) of $CF_3SO_3H$, 1.26 g. (20 mmol) anhydrous $HNO_3$ and 0.73 g. (5 mmol) of benzotrifluoride in 60 ml. $CH_2Cl_2$. Product weight was 0.98 g., theoretical weight of nitrobenzotrifluorides is 0.96 g. A VPC analysis showed that the product contained 7.6, 92.3, and 0.1% o-, m-, and p-nitrobenzotrifluoride, respectively.

Example 18.—Nitration of m-xylene m-xylene was nitrated according to the method of Example 9. The reaction was run at 25° C. for 1 hr. using 6.30 g. (42 mmol) of $CF_3SO_3H$, 1.32 g. (21 mmol) of anhydrous $HNO_3$, and 1.06 g. (10 mmol) of m-xylene in 63 ml. of $CH_2Cl_2$. The product weight was 1.98 g.; the theoretical weight of dinitroxylene (DNX) is 1.96. VPC analysis showed that the product contained 63.4, 36.6, 0.4, 0.3, and 0.5% 4,6-, 2,4-, 4,5-, 2,5-DNX, and an unknown product, respectively.

Trifluoromethanesulfonic acid is commercially available from the 3M Company and is sold by them under the trade name Trimsylate Acid FC-24.

We claim:

1. A method for the nitration of aromatic compounds which comprises reacting said compounds with a nitrating reagent made up of the reaction product of one molar part of nitric acid and two molar parts of trifluoromethanesulfonic acid, said nitration being conducted at temperatures between about −110° and 30° C. in the presence of a reaction medium made up of an organic solvent, sulfuric acid, an excess of trifluoromethanesulfonic acid or a mixture of sulfuric acid and an excess of trifluoromethanesulfonic acid, said nitrating reagent being present in at least the amount stoichiometrically required to effect the desired nitration.

2. The method of claim 1 wherein the aromatic compound to be nitrated is benzene or a derivative compound wherein the benzene ring is substituted by one or more loweralkyl, halo, nitro or halo(lower)alkyl groups.

3. The method of claim 1 wherein the compound to be nitrated is toluene, wherein conversion of toluene to mononitrotoluene is effected between about −110° and −30° C. and wherein conversion of the mononitrotoluene to dinitrotoluene is effected at temperatures above −30° C.

4. The method of claim 3 wherein the conversion of mononitrotoluene to dinitrotoluene is effected at about 0° C.

References Cited

UNITED STATES PATENTS

| | | | |
|---|---|---|---|
| 3,326,983 | 6/1967 | Vesely et al. | 260—645 X |
| 3,634,520 | 1/1972 | Crivello | 260—645 X |

FOREIGN PATENTS

| | | | |
|---|---|---|---|
| 959,403 | 6/1964 | Great Britain | 260—646 |

OTHER REFERENCES

Senning: Chem. Reviews, vol. 65, pp. 404, 408 and 409 (1965).

LELAND A. SEBASTIAN, Primary Examiner

U.S. Cl. X.R.

252—182; 260—646